(12) United States Patent
Elliot

(10) Patent No.: US 10,352,738 B2
(45) Date of Patent: Jul. 16, 2019

(54) MULTI-LAYER ELECTRICALLY CONDUCTIVE SENSOR

(71) Applicant: FUTURE TECHNOLOGY (SENSORS) LTD, Oxfordshire (GB)

(72) Inventor: Howard Elliot, Oxfordshire (GB)

(73) Assignee: Future Technology (Sensors) LTD, Oxfordshire (GB)

( * ) Notice: Subject to any disclaimer, the term of this patent is extended or adjusted under 35 U.S.C. 154(b) by 0 days.

(21) Appl. No.: 15/771,220

(22) PCT Filed: Nov. 21, 2016

(86) PCT No.: PCT/GB2016/053619
§ 371 (c)(1),
(2) Date: Apr. 26, 2018

(87) PCT Pub. No.: WO2017/089749
PCT Pub. Date: Jun. 1, 2017

(65) Prior Publication Data
US 2019/0056250 A1 Feb. 21, 2019

(30) Foreign Application Priority Data

Nov. 24, 2015 (GB) .................................. 1520750.9

(51) Int. Cl.
*G01D 5/16* (2006.01)
*G01D 11/24* (2006.01)
(52) U.S. Cl.
CPC ............. *G01D 11/245* (2013.01); *G01D 5/16* (2013.01); *G01D 11/24* (2013.01)
(58) Field of Classification Search
CPC .............................. G01D 11/245; G01D 5/16
(Continued)

(56) References Cited

U.S. PATENT DOCUMENTS

| | | |
|---|---|---|
| 4,804,905 A | 2/1989 | Ding et al. |
| 5,760,593 A | 6/1998 | Lawrence et al. |

(Continued)

FOREIGN PATENT DOCUMENTS

| | | |
|---|---|---|
| EP | 2330408 A1 | 6/2011 |
| GB | 2225855 A | 6/1990 |

(Continued)

OTHER PUBLICATIONS

International Search Report (Form PCT/ISA/210) for International Patent Application No. PCT/GB2016/053619, issued from the European Patent Office, dated Feb. 24, 2017, 3 pages.

(Continued)

*Primary Examiner* — Farhana A Hoque
(74) *Attorney, Agent, or Firm* — Kilyk & Bowersox, P.L.L.C.

(57) ABSTRACT

A sensor assembly includes an electrically conductive electrode bridge (26) and a multi-layer, integral sensor body (1). The sensor body (1) includes a core layer (2), an outer insulating layer (4) that substantially surrounds the core layer (2), and an electrically conductive electrode layer (6) between the core layer (2) and the outer insulating layer (4). The sensor body (1) also includes an electrically conductive electrode interface layer (14) at a rear part (12) of the sensor body (1) and in electrical contact with the electrode layer (6). The electrode bridge (26) is held in compression electrical contact with the electrode interface layer (14) during use.

20 Claims, 3 Drawing Sheets

(58) Field of Classification Search
USPC .................................................. 324/662, 691
See application file for complete search history.

(56) References Cited

U.S. PATENT DOCUMENTS

| | | |
|---|---|---|
| 9,372,204 B2 | 6/2016 | Elliott |
| 2002/0148737 A1 | 10/2002 | Haaf |
| 2013/0321002 A1* | 12/2013 | Elliott .................. G01D 11/245 |
| | | 324/662 |

FOREIGN PATENT DOCUMENTS

| | | |
|---|---|---|
| GB | 2406381 A | 3/2005 |
| WO | 2012049443 A2 | 4/2012 |

OTHER PUBLICATIONS

Written Opinion of the International Searching Authority (Form PCT/ISA/237) for International Patent Application No. PCT/GB2016/053619, issued from the European Patent Office, dated Feb. 24, 2017, 5 pages.
Search Report for Application No. GB1520750.9, published by the United Kingdom Intellectual Property Office, date of search May 27, 2016, 1-page.

* cited by examiner

MULTI-LAYER ELECTRICALLY CONDUCTIVE SENSOR

TECHNICAL FIELD

The present invention relates to sensor assemblies, and in particular to sensor assemblies that incorporate a ceramic sensor body and that can be used in high temperature operating environments.

BACKGROUND ART

Known sensor assemblies typically comprise composite ceramic/metal components that are brazed together using a conventional brazing process. Such a known sensor assembly might include a metal housing with a metallised aluminium oxide bush brazed into the inner diameter of the housing. A sensor body is then brazed into the internal diameter of the bush.

The sensor body can be made of one or more layers of metal, electrically conductive ceramic, electrically non-conductive ceramic that is made conductive by having a layer of conductive material (e.g., a metal) deposited on its surface, or a conductive ceramic/metal composite, for example. Conductive layers can define electrodes or other sensing elements or shield layers. Non-conductive layers can define insulating spacers that are positioned between conductive layers. The layers that form the sensor body can be machined as a preformed part and then bonded to an adjacent layer or deposited on an adjacent layer using any suitable deposition process. If the outer layer of the sensor body is made substantially from a ceramic material, then its outer surface can be metallised so that the sensor body can be brazed directly into the housing using a conventional brazing process without the need for the intermediate bush.

The metal housing parts of the sensor assembly might be manufactured from a low expansion alloy which is specifically designed to have a coefficient of thermal expansion substantially similar to that of the bush and/or the sensor body. If the sensor assembly is exposed to high temperatures during operation then the housing, bush and sensor body all expand at similar rates to minimise the thermal stress between the individual components.

One problem with the use of low expansion alloys is that they tend to oxidise at temperatures approaching 500° C. This places an upper limit on the operating temperature of the sensor assembly. It can be difficult to find a metal that is suitable for use at higher temperatures and which also has a thermal expansion coefficient that is substantially similar to that of the bush and/or the sensor body. A known solution is to use so-called 'active braze' processes which allow certain ceramic materials to be brazed to metals without the need for metallised coatings and also provide a degree of compliance between the two different materials to accommodate the different rates of thermal expansion. In practice, however, the operating temperature of active braze alloys is limited to about 800° C. which is still not sufficiently high for certain operations. The compliant coatings that are needed to provide the degree of compliance also tend to oxidise at temperatures below 500° C. and it is normally necessary to provide a hermetic seal at the braze interface to minimise the oxidation effect.

Further problems are known to exist in situations where large relative movements occur between the component parts of the sensor assembly as a result of thermal expansion. Large relative movement can only be accommodated by increasing the thickness of the compliant coatings and this can place practical limitations on the design of the sensor assembly.

In many industrial measurement applications there is a need for a sensor assembly that can be used at high operating temperatures to measure the distance to either a stationary or passing object. A typical application is the measurement of clearance between the tip of a gas turbine engine blade and the surrounding casing. In this situation the operating temperature of the sensor assembly can reach 1500° C. Other applications including molten metal and molten glass level measurement, for example, have similar operating temperature requirements.

U.S. Pat. No. 5,760,593 (BICC plc) and U.S. Pat. No. 4,804,905 (Ding et al.) describe sensor assemblies having an electrode, optionally in the form of a metal coating or layer, that couples capacitively with the stationary or passing object. The electrode is connected to the centre conductor of a standard triaxial transmission cable and is surrounded by a metal shield and a metal outer housing. The shield and the outer housing are connected directly to the intermediate conductor and the outer conductor of the triaxial transmission cable respectively. An insulating layer is provided between the electrode and the shield and also between the shield and the outer housing. The insulating layers can be in the form of machined ceramic spacers or deposited ceramic layers, for example.

One problem with these conventional sensors is that they typically utilise an alternating combination of metal and ceramic materials. As the operating temperature of the sensor assembly increases, the metal components tend to expand more than the ceramic components. This often results in stress fractures forming in the ceramic spacers or layers, which reduce their electrical performance and may even result in the disintegration or de-lamination of the ceramic components. Not only does this cause the sensor assembly to fail electrically, but the disintegration or de-lamination of the ceramic components also allows the metal components to vibrate and this can result in the mechanical failure of the complete sensor assembly. A similar problem can occur if electrically conductive ceramics are used since just a small difference in the respective coefficients of thermal expansion (CTE) can be significant over the expected lifetime of the sensor assembly.

Gas turbine engine manufacturers now require an operating lifetime of at least 20,000 hours for sensors that are to be fitted to production models. Although conventional sensors have been successfully used at high operating temperatures for short periods of time, it is unlikely that they will ever be able to meet the required operating lifetime because of the inherent weakness of the sensor assembly caused by the different thermal expansion properties of the metal and ceramic (or ceramic and ceramic) components.

Conventional sensor assemblies are also susceptible to moisture penetration which can reduce the performance of the sensor.

International Patent Application WO 2012/049443 (Future Technology (Sensors) Ltd) describes a sensor body with an electrically conductive electrode layer between a core layer and an insulating layer. The electrode layer may be exposed at a rear face of the sensor body to allow it to be connected, either directly, or indirectly by means of an intermediate electrically conductive metal bridge, to an inner conductor of a coaxial or triaxial transmission cable. The metal bridge is typically brazed to the sensor body. But such brazed layers formed when ceramic and metal components are brazed together can, in some circumstances, restrict operating lifetime and temperature due to the difference in CTE. This can sometimes cause failure of the brazed layer after repeated thermal cycles.

SUMMARY OF THE INVENTION

The present invention provides a sensor assembly comprising: an electrically conductive electrode bridge; and a sensor body comprising: a core layer; an outer insulating layer that substantially surrounds the core layer; an electrically conductive electrode layer between the core layer and the outer insulating layer; and an electrically conductive electrode interface layer at a rear part of the sensor body and in electrical contact with the electrode layer; wherein the electrode bridge is in compression electrical contact with the electrode interface layer.

A front part of the sensor body, in use, will normally be the part of the sensor body that is exposed directly to high operating temperatures, for example. The electrode layer can be set back from the front face of the sensor body and can be substantially surrounded by the insulating layer (i.e., substantially embedded within the integral sensor body).

The electrode layer is electrically connected to the electrode interface layer at a rear part of the sensor body.

The electrode bridge is electrically connected, in use, to an inner conductor of a coaxial or triaxial transmission cable that carries measurement signals from the sensor assembly to external signal processing electronics. If the sensor body is fitted within a metal outer housing (see below), the outer housing can be connected to the outer conductor of a coaxial or triaxial transmission cable.

In the case of a triaxial sensor body, an electrically conductive shield (or guard) layer can be positioned between the core layer and the outer insulating layer. The shield layer can be spaced from the electrode layer by an inner insulating layer. The inner insulating layer can be formed from the same electrically non-conducting ceramic material as both the core layer and the outer insulating layer. The sensor body can include an electrically conductive shield interface layer at a rear part of the sensor body and in electrical contact with the shield layer. The shield layer is electrically connected to the shield interface layer at the rear part of the sensor body. The sensor assembly can include a shield bridge in compression electrical contact with the shield interface layer. The shield bridge can be electrically connected to an intermediate conductor of a triaxial transmission cable. The electrode and shield bridges are electrically insulated from each other. In one arrangement, the shield bridge can be substantially cylindrical and is located radially outside the inner electrode bridge and spaced apart from the electrode bridge by an annular gap. This ensures that there is no electrical contact between the electrode bridge and the electrode bridge which might interfere with the measurement signals.

Each bridge can be made of any suitable electrically conductive material, e.g., a metal, and in particular a nickel-chromium-based alloy such Inconel® 600 or 625 or Haynes® 230 which are typically resistant to oxidation and maintain structural integrity at high operating temperatures. It will be understood that each bridge is not bonded or otherwise physically secured to the respective interface layer but is only in pressure contact with it. The compression force applied between each bridge and the respective interface layer will typically be sufficient such that the asperities or slight projections on adjoining surfaces experience plastic deformation, thereby increasing the contact area as required to reduce electrical contact resistance between the components.

The core layer and the outer insulating layer are preferably pre-formed as separate components from the same electrically non-conducting ceramic material and bonded together to form an integral, multi-layer, bulk ceramic component. Any suitable electrically non-conductive, preferably non-porous, ceramic material can be used, for example silicon nitride (SiN) or SiAlON. Because the bulk constituent layers of the sensor body (e.g. the core layer and the insulating layer(s)) are formed from the same electrically non-conducting ceramic material, the problem of differential thermal expansion is eliminated for all practical purposes.

Each interface layer can be formed from one or more layers or coatings. Each interface layer is optionally formed from an electrically conductive ceramic material, a ceramic composite material, a metal or metal alloy, or any combination thereof. Examples might include coatings based on SiC, CrAlTiN or MCrAlY. Each interface layer can have an overall thickness greater than about 100 µm in some arrangements.

Each interface layer can be applied to a rear face of the sensor body (or the rear face of the bulk ceramic component) as a coating, optionally using a suitable deposition process, e.g., plasma vapour deposition (PVD), chemical vapour deposition (CVD), plasma spraying etc. The shape of each interface layer will be consistent with the shape of the respective bridge against which it is in compression electrical contact in use. The rear face of each interface layer is preferably substantially planar to provide a suitable contact area for the front face of the respective bridge. The electrode and shield interface layers are electrically insulated from each other, e.g., spaced apart by an air gap or other insulating layer. In one arrangement, the applied shield interface layer can be substantially cylindrical and is located radially outside an applied electrode interface layer that is substantially circular and where the shield interface layer and electrode interface layer are spaced apart by an annular air gap.

SiC-based coatings (preferably applied using a CVD process) can be particularly advantageous if the ceramic material for the core layer and insulating layer(s) of the sensor body is SiN or SiAlON because there is a common base material, namely silicon, and the materials bond readily together during the coating process to form a robust electrically conductive layer that provides a hermetic seal at the rear face of the sensor body such that gas (e.g. air) is excluded from all internal interfaces. SiC-based coatings and silicon-based ceramic materials also have very similar CTE characteristics that minimises stresses at the interface between the two materials.

The use of interface layers instead of brazing the bridges directly to the sensor body simplifies the construction of the sensor assembly, allows it to operate at higher temperatures and extends operating lifetime. In particular, the proposed coatings can be used at much higher operating temperatures than the active braze alloys that are often used to braze the bridges to the rear face of the sensor body. The maximum operating temperature of the active braze alloys is about 800° C. whereas SiC-based coatings, for example, can operate at temperatures up to about 1600° C., which is in excess of the typical temperatures experienced in gas turbine applications.

The electrode layer can be formed from one or more layers or coatings. The electrode layer is optionally formed from an electrically conductive ceramic material, a ceramic composite material, a metal or metal alloy, or any combination thereof, and can include a braze alloy layer in isolation, or combined with, one or more of the aforementioned materials. The electrode layer can be formed, at least in part, from titanium, an alloy of titanium or titanium nitride. The electrode layer can be applied to the ceramic component that defines the core layer and/or the ceramic component that defines the outer insulating layer as a coating, optionally using a suitable deposition process.

The shield layer can be formed from one or more layers or coatings. The shield layer is optionally formed from an electrically conductive ceramic material, a ceramic composite material, a metal or metal alloy, or any combination thereof, and can include a braze alloy layer in isolation, or combined with, one or more of the aforementioned materials. The shield layer can be formed, at least in part, from titanium, an alloy or titanium or titanium nitride. The shield layer can be applied to the ceramic component that defines the inner insulating layer and/or the ceramic component that defines the outer insulating layer as a coating, optionally using a suitable deposition process. The coating can define a substantially cylindrical shield layer that is coaxial with the electrode layer and is spaced apart from it by the inner insulating layer.

The use of titanium, a titanium alloy or titanium nitride as part of the electrode layer and/or shield layer can provide a significant improvement in the quality of the finished sensor body.

In one arrangement, the outer insulating layer extends along a front part of the sensor body to define a window layer that provides a hermetic seal that excludes gas (e.g., air) from any interface between the constituent layers of the sensor body and which can be substantially transparent to electromagnetic radiation. This can allow more flexibility in the design and materials used in the sensor body. The sensor assembly can also be exposed to high operating temperatures (e.g., up to about 1500° C.) because the constituent layers of the sensor body are not subjected to oxidation. The electrode layer can extend between the core layer and the window layer.

The ceramic component (or body) forming the outer insulating layer can be a single-piece component having a main part and a window part which defines the window layer of the sensor body. The window part can be the closed end of a blind bore in the component. Alternatively, the ceramic component can be a two-piece component having a main part and a separate disc part which is bonded to the main part and which defines the window layer of the sensor body. The disc part can either be located in a bore in the main part to close one end of the bore such that the outer edge surface of the disc part is bonded to a facing inner surface of the main part, or be bonded to an annular front surface of the main part. The disc part can be made from the same electrically non-conductive, preferably non-porous, ceramic material as the main part and can be machined after it has been bonded to the main part.

In another arrangement, the electrode layer is electrically connected to an electrically conductive front layer at a front part of the sensor body. The front layer can be formed from one or more layers or coatings and can extend over substantially the whole of the front face of the sensor body. The front layer defines a larger electrode area that can increase the measurement range of the sensor assembly.

The front layer is optionally formed from an electrically conductive ceramic material, a ceramic composite material, a metal or metal alloy, or any combination thereof. Examples might include coatings based on SiC, CrAlTiN or MCrAlY. The front layer can have an overall thickness greater than about 100 μm in some arrangements. The front layer can be applied to the front face of the sensor body (or the front face of the bulk ceramic component) as a coating, optionally using a suitable deposition process, e.g., PVD, CVD, plasma spraying etc. SiC-based coatings (preferably applied using a CVD process) can be particularly advantageous for the front layer if the ceramic material for the core layer and insulating layer(s) of the sensor body is SiN because there is a common base material, namely silicon, and the materials bond readily together during the coating process to form a robust electrically conductive layer that provides a hermetic seal at the front face of the sensor body such that gas (e.g., air) is excluded from all internal interfaces. The front layer therefore provides the same hermetic sealing function as the window layer. Also, SiC-based coatings and silicon-based ceramic materials have very similar CTE characteristics that minimises stresses at the interface between the two materials.

The front layer and each interface layer can be formed from the same coating material.

Providing a front layer that defines an electrode area can allow the diameter of the core layer to be reduced, significantly reducing sensor body capacitance and improving sensitivity. A front layer removes the need for a window layer of electrically non-conducting ceramic material at the front face of the sensor body but maintains a hermetic seal.

A thermal barrier coating or layer can be provided on the front layer or the window layer defined by the outer insulating layer. The thermal barrier coating can be applied as a multi-layer coating, e.g., with a ceramic based thermal barrier layer with a thermally conductive metallic sub-layer. The thermal barrier layer can be formed from any suitable material, e.g., yttria-stabilised zirconium (YSZ), and can be applied using any suitable process. The thermal barrier coating can optionally extend along at least part of the cylindrical outer surface of the front part of the sensor body (i.e., not just on the front face of either the front layer or the window layer) to provide additional thermal protection to the front part of the sensor body.

In the case of a coaxial sensor body (i.e., without a shield layer), the ceramic component that defines the core layer can be pre-coated with the electrode layer and positioned within a bore in the ceramic component that defines the outer insulating layer. Alternatively, the bore in the ceramic component that defines the outer insulating layer can be pre-coated with the electrode layer before the ceramic component that defines the core layer is positioned within it. The ceramic components defining the core layer and the outer insulating layer are then bonded together using a suitable process such as sintering, diffusion bonding or brazing, for example, depending on the type of material that is used as the electrode layer.

In the case of a triaxial sensor body (i.e., with a shield layer), the ceramic component that defines the core layer can be pre-coated with the electrode layer and positioned within a bore in a ceramic component that defines the inner insulating layer. Alternatively, the bore in the ceramic material that defines the inner insulating layer can be pre-coated with the electrode layer before the ceramic component that defines the core layer is positioned within it. The ceramic components defining the core layer and the inner insulating layer are then bonded together using a suitable process such as sintering, diffusion bonding or brazing, for example, depending on the type of material that is used as the electrode layer. The ceramic component that defines the inner insulating layer can be pre-coated with the shield layer and positioned within a bore in a ceramic component that defines the outer insulating layer. Alternatively, the bore in the ceramic material that defines the outer insulating layer can be pre-coated with the shield layer before the bonded ceramic components that define the core and inner insulating layers are positioned within it. The ceramic components defining the inner and outer insulating layers are then bonded together using a suitable process such as sintering, diffusion bonding or brazing, for example, depending on the type of material that is used as the electrode and shield layers. In an alternative process the ceramic components defining the core layer, the inner insulating layer and the outer insulating layer, pre-coated as appropriate with the electrode and shield layers, are bonded together in a single step using a suitable process such as sintering, diffusion bonding or brazing, for example.

The present invention further provides an alternative sensor assembly without an electrode layer but with an electrically conductive core layer or electrode. The sensor assembly comprises: an electrically conductive electrode bridge; and a sensor body comprising: an electrically conductive core layer (or electrode); an outer insulating layer that substantially surrounds the core layer; and an electrically conductive electrode interface layer at a rear part of the sensor body and in electrical contact with the core layer; wherein the electrode bridge is in compression electrical contact with the electrode interface layer.

The core layer can be made of any suitable electrically conductive material, e.g., a metal, a ceramic/metal composite or a ceramic (e.g., SiC), or any combination thereof.

The electrically conductive core layer can be set back from the front face of the sensor body and can be substantially surrounded by the insulating layer (i.e., substantially embedded within the integral sensor body).

The core layer is electrically connected to the electrode interface layer at the rear part of the sensor body.

The electrode bridge is electrically connected, in use, to an inner conductor of a coaxial or triaxial transmission cable that carries measurement signals from the sensor assembly to external signal processing electronics. If the sensor body is fitted within a metal outer housing (see below), the outer housing can be connected to the outer conductor of a coaxial or triaxial transmission cable.

In the case of a triaxial sensor body, an electrically conductive shield (or guard) layer can be positioned between the core layer and the outer insulating layer. The shield layer can be spaced from the electrically conductive core layer by an inner insulating layer that is preferably formed from the same electrically non-conducting ceramic material as the outer insulating layer. The sensor body can include an electrically conductive shield interface layer at a rear part of the sensor body and in electrical contact with the shield layer. The shield layer is electrically connected to the shield interface layer at the rear part of the sensor body. The sensor assembly can include a shield bridge in compression electrical contact with the shield interface layer. The shield bridge can be electrically connected to an intermediate conductor of a triaxial transmission cable. The electrode and shield bridges are electrically insulated from each other.

The bridges and interface layers are as described generally above. SiC-based coatings (preferably applied using a CVD process) can be particularly advantageous if the ceramic material for the core layer is SiC and the ceramic material for the insulating layer(s) of the sensor body is SiN or SiAlON because there is a common base material, namely silicon, and the materials bond readily together during the coating process to form a robust electrically conductive layer that provides a hermetic seal at the rear face of the sensor body such that gas (e.g. air) is excluded from all internal interfaces. SiC-based coatings and silicon-based ceramic materials also have very similar CTE characteristics that minimises stresses at the interface between the two materials.

The core layer and the outer insulating layer can be pre-formed as separate ceramic components (i.e., from an electrically conductive and an electrically non-conductive ceramic material, respectively) and bonded together to form an integral, multi-layer, bulk ceramic component. Any suitable electrically conductive, preferably non-porous, ceramic material can be used for the core layer, for example silicon carbide (SiC). Similarly, any suitable non-conductive, preferably non-porous, ceramic material can be used for the outer insulating layer, for example silicon nitride (SiN) or SiAlON. Because the bulk constituent layers of the sensor body (e.g. the core layer and the insulating layer(s)) are formed from the ceramic material, the problem of differential thermal expansion is eliminated for all practical purposes.

The shield layer is as described generally above.

In one arrangement, the outer insulating layer extends along a front part of the sensor body to define a window layer that provides a hermetic seal that excludes gas (e.g., air) from any interface between the constituent layers of the sensor body and which can be substantially transparent to electromagnetic radiation. In another arrangement, the electrically conductive core layer is electrically connected to an electrically conductive front layer. The front layer is as described generally above and defines an electrode area.

A thermal barrier coating can optionally be applied to the front part of the sensor body (e.g., to the front layer or the window layer) as described above.

In the case of a coaxial sensor body (i.e., without a shield layer), the ceramic component that defines the core layer can be positioned within a bore in the ceramic component that defines the outer insulating layer. The ceramic components defining the core layer and the outer insulating layer are then bonded together using a suitable process such as sintering, diffusion bonding or brazing, for example, depending on the type of material that is used as the electrode layer. If the core layer is formed from a non-ceramic material (e.g., a metal) then a suitable process can be used to bond the core layer and the ceramic component that defines the outer insulating layer.

In the case of a triaxial sensor body (i.e., with a shield layer), the ceramic component that defines the core layer can be positioned within a bore in a ceramic component that defines the inner insulating layer. The ceramic components defining the core layer and the inner insulating layer are then bonded together using a suitable process such as sintering, diffusion bonding or brazing, for example, depending on the type of material that is used as the electrode layer. If the core layer is formed from a non-ceramic material (e.g., a metal) then a suitable process can be used to bond the core layer and the ceramic component that defines the inner insulating layer. The ceramic component that defines the inner insulating layer can be pre-coated with the shield layer and positioned within a bore in a ceramic component that defines the outer insulating layer. Alternatively, the bore in the ceramic material that defines the outer insulating layer can be pre-coated with the shield layer before the bonded ceramic components that define the core and inner insulating layers are positioned within it. The ceramic components defining the inner and outer insulating layers are then bonded together using a suitable process such as sintering, diffusion bonding or brazing, for example, depending on the type of material that is used as the electrode and shield layers. In an alternative process the ceramic components defining the core layer, the inner insulating layer and the outer insulating layer, pre-coated as appropriate with the shield layer, are bonded together in a single step using a suitable process such as sintering, diffusion bonding or brazing, for example.

The various ceramic components (or bodies) used to form the various coaxial and triaxial sensor bodies described above can be formed from un-sintered (or 'green'), partially or fully sintered ceramic material, for example.

The sensor body, or more particularly, the outer insulating layer, can include a radial flange allowing it to be fitted within an outer housing that forms part of the sensor assembly. The housing can have an annular groove in which the radial flange of the sensor body is received, the annular groove being defined by a pair of facing shoulders each having an annular surface and a substantially cylindrical surface. The annular surfaces of the shoulders are preferably in sliding contact with annular surfaces of the flange and apply a compressive load to the flange.

The sensor body is not physically secured to the housing (e.g., by brazing) but is firmly held within the housing as a result of the compressive load that is applied to the flange by the annular surfaces of the shoulders. The particular construction of sensor assembly means that there are no significant problems with differential thermal expansion and the sensor assembly is therefore inherently suitable for high temperature operation. The sensor assembly can be manufactured in a cost-effective manner using conventional brazing process as described in more detail below.

The housing is preferably a two-part housing formed from a high temperature metal and generally as described in European Patent Application 2330408 (Future Technology (Sensors) Ltd). More particularly, one of the facing shoulders is preferably formed in a first housing part and the other of the facing shoulders is preferably formed in a second housing part. The first and second housing parts are secured together to form the two-part housing in such a way that the shoulders are in register and define the annular groove into which the radial flange of the sensor body is received. The flange is therefore normally held between the two housing parts by the applied compressive load.

The first housing part is preferably brazed to the second housing part by a braze material. Any suitable braze material can be used.

The sliding contact between the housing and the annular surfaces of the flange under the compressive load preferably provides a hermetic seal between the housing and the sensor body. The hermetic seal is maintained even when the sensor assembly is exposed to high operating temperatures.

It will be readily appreciated that the relative size and thickness of the various layers, coatings etc. shown in FIGS. 1 to 6 are not indicative of any practical sensor assembly and are simply for the purposes of illustrating the various component parts of the present invention.

DESCRIPTION OF THE INVENTION

Figure 1:
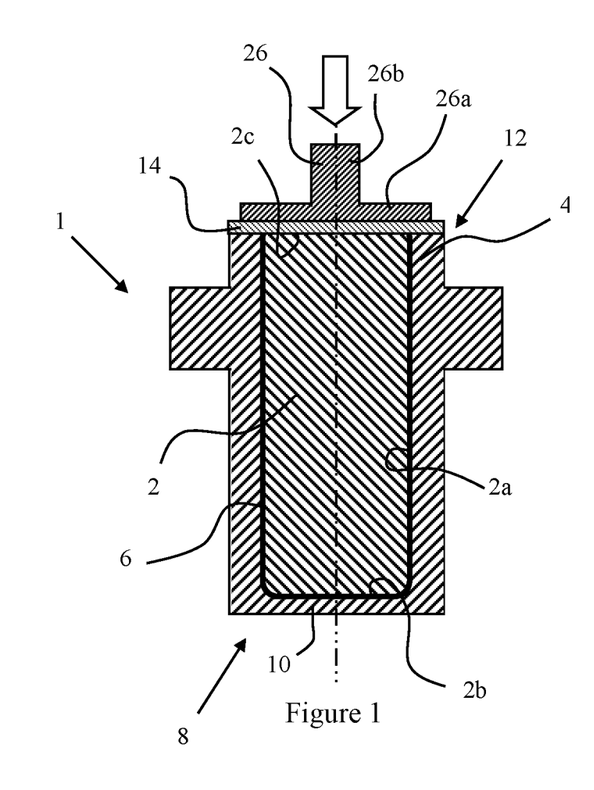
FIG. 1 is an axial cross section diagram showing a first coaxial sensor assembly according to the present invention.

FIG. 1 shows a first coaxial sensor assembly according to the present invention. A coaxial sensor body 1 includes a core layer 2 and an outer insulating layer 4 that are made of the same electrically non-conductive ceramic material such as silicon nitride (SiN) or SiAlON. An electrode layer 6 of metal such as titanium (Ti) or molybdenum (Mo), an alloy of titanium, or an electrically conductive ceramic such as titanium nitride (TiN) or molybdenum disilicide ($MoSi_2$) is applied as a coating and covers the cylindrical outer surface 2a of the core layer 2 (or the cylindrical inner surface of the outer insulating layer 4). The electrode layer 6 covers the front planar surface 2b and optionally the rear planar surface 2c of the core layer 2.

The outer insulating layer 4 extends along a front part 8 of the sensor body 1 which in use is exposed directly to high operating temperatures. For example, if the sensor assembly forms part of a capacitive sensor that is used to measure the clearance between the tip of a gas turbine engine blade and the surrounding casing, the front part 8 of the sensor body 1 might face towards the blade tip and be exposed to temperatures of up to about 1500° C. Along the front part 8, the outer insulating layer 4 defines a window layer 10 that is substantially transparent to electromagnetic radiation. The electrode layer 6 extends between the window layer 10 and the planar front surface 2b of the core layer 2 such that the electrode layer is substantially embedded within the front part 8 of the sensor body 1 and is not exposed.

The window layer 10, being an integral part of the outer insulating layer 4, provides a hermetic seal at the front part of the sensor body 1 meaning that gas is excluded from all internal interfaces. An electrode interface layer 14 (see below) at the rear part of the sensor body 1 also provides a hermetic seal.

The core layer 2 and the outer insulating layer 4 are pre-formed as separate ceramic components or bodies. The electrode layer 6 is deposited as a coating on the cylindrical outer surface, and the front and rear planar surfaces of the pre-formed ceramic body that defines the core layer 2. The pre-coated core body is inserted into a blind bore in the pre-formed ceramic body that defines the outer insulating layer 4. The pre-coated core body and the outer insulating body are then bonded together using a suitable process such as sintering, diffusion bonding or brazing, for example. The bonding process produces an integral, multi-layer bulk ceramic component. The electrode layer can also be alternatively or additionally deposited as a coating on the cylindrical inner surface of the blind bore in the pre-formed ceramic body that defines the outer insulating layer 4 before the ceramic body that defines the core layer is inserted into it.

The electrode layer 6 is electrically connected to an electrode interface layer 14 at a rear part 12 of the sensor body 1. The electrode interface layer 14 is formed of several layers of a SiC-based coating (or a CrAlTiN- or MCrAlY-based coating) applied to a rear face of the bulk ceramic component using a chemical vapour deposition (CVD) process.

An electrode bridge 26 made of a nickel-chromium-based alloy (e.g., Inconel® 600) is held in compression electrical contact with the electrode interface layer 14. The electrode bridge 26 is not bonded or otherwise physically secured to the electrode interface layer 14. The electrode bridge 26 includes a planar part 26*a* that is held adjacent the electrode interface layer 14 by the application of a compression force (represented in FIG. 1 by the block arrow) and a rearwardly extending part 26*b* that is connected to the inner conductor of a coaxial (or triaxial) transmission cable which is not shown.

Figure 2:
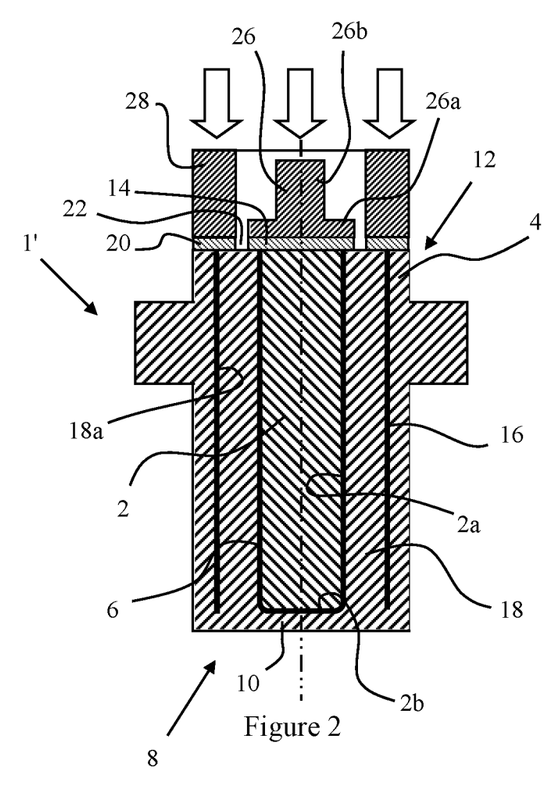
FIG. 2 is an axial cross section diagram showing a first triaxial sensor assembly according to the present invention.
Figure 3:
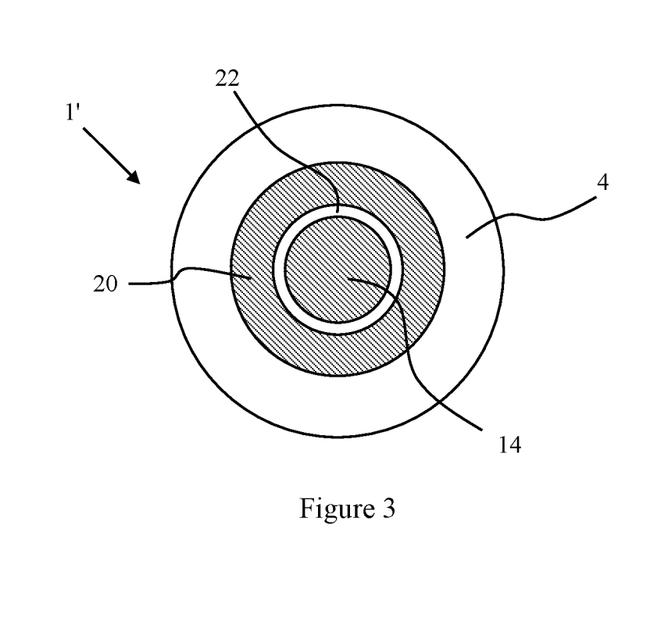
FIG. 3 is a radial cross section diagram through the interface layers of the first triaxial sensor assembly of FIG. 2.
Figure 4:
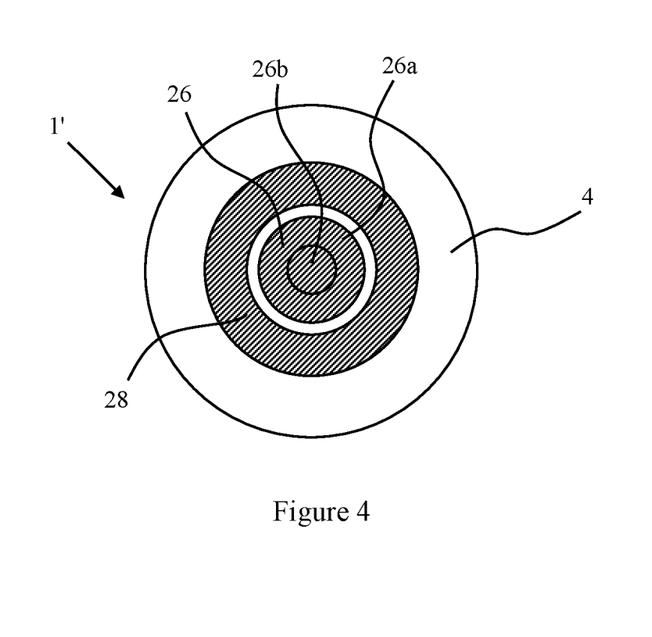
FIG. 4 is an end diagram of the rear part of the first triaxial sensor assembly of FIG. 2.

FIGS. 2 to 4 show a first triaxial sensor assembly according to the present invention. The triaxial sensor body 1' is similar to the coaxial sensor body 1 shown in FIG. 1 and like parts have been given the same reference numerals. The triaxial sensor body 1' includes a cylindrical shield (or guard) layer 16 of metal such as titanium or molybdenum, an alloy of titanium, or an electrically conductive ceramic such as titanium nitride or molybdenum disilicide, that is connected to the intermediate conductor of a triaxial transmission cable which is not shown.

The shield layer 16 is spaced from the electrode layer 6 by an inner insulating layer 18 and is surrounded by the outer insulating layer 4. The shield layer 16 is applied as a coating and covers the cylindrical outer surface 18*a* of the inner insulating layer 18 (or the cylindrical inner surface of the outer insulating layer 4).

The shield layer 16 is spaced from the front face of the sensor body 1' by the window layer 10.

The core layer 2, the inner insulating layer 18 and the outer insulating layer 4 are pre-formed as separate ceramic components or bodies. The electrode layer 6 is deposited as a coating on the cylindrical outer surface, and the front and rear planar surfaces of the pre-formed ceramic body that defines the core layer. The pre-coated body is inserted into an open bore in the pre-formed ceramic body that defines the inner insulating layer. The pre-coated core body and the inner insulating body are then bonded together using a suitable process such as sintering, diffusion bonding or brazing, for example. The electrode layer can also be alternatively or additionally deposited as a coating on the cylindrical inner surface of the open bore before the ceramic body that defines the core layer is inserted into it. The shield layer 16 is deposited as a coating on the cylindrical outer surface of the inner insulating body. The pre-coated inner insulating body and the bonded core body are inserted into a blind bore in the pre-formed ceramic body that defines the outer insulating layer. The pre-coated inner insulating layer and the outer insulating body are then bonded together using a suitable process such as sintering, diffusion bonding or brazing, for example. The bonding process produces an integral, multi-layer bulk ceramic component. The shield layer can also be alternatively or additionally deposited as a coating on the cylindrical inner surface of the blind bore in the pre-formed ceramic body that defines the outer insulating layer 4 before the ceramic body that defines the inner insulating layer is inserted into it. In an alternative process, the various ceramic bodies are coated with the electrode layer and the shield layer and then bonded together in a single step using a suitable process such as sintering, diffusion bonding or brazing, for example.

The shield layer 16 is electrically connected to a shield interface layer 20 at the rear part 12 of the sensor body 1'. The shield interface layer 20 is formed of several layers of a SiC-based coating (or a CrAlTiN- or MCrAlY-based coating) applied to a rear face of the bulk ceramic component using a CVD process. As best seen in FIG. 3, the shield interface layer 20 is annular and is spaced apart from the radially inner circular electrode interface layer 14 by an annular gap 22.

A shield bridge 28 made of a nickel-chromium-based alloy (e.g., Inconel® 600) is held in compression electrical contact with the shield interface layer 20. The shield bridge 28 is not bonded or otherwise physically secured to the shield interface layer 20. As best seen in FIG. 4, the shield bridge 28 is cylindrical and is spaced apart from the radially inner electrode bridge 26 which includes a planar part 26*a* and a rearwardly extending part 26*b*. The electrode bridge 26 and shield bridge 28 are held adjacent the electrode interface layer 14 and the shield interface layer 20, respectively, by the application of compression forces (represented in FIG. 2 by the block arrows). The rearwardly extending part 26*b* of the electrode bridge 26 is connected to the inner conductor of a triaxial transmission cable which is not shown and the shield bridge 28 is connected to the intermediate conductor of the triaxial transmission cable.

Figure 5:
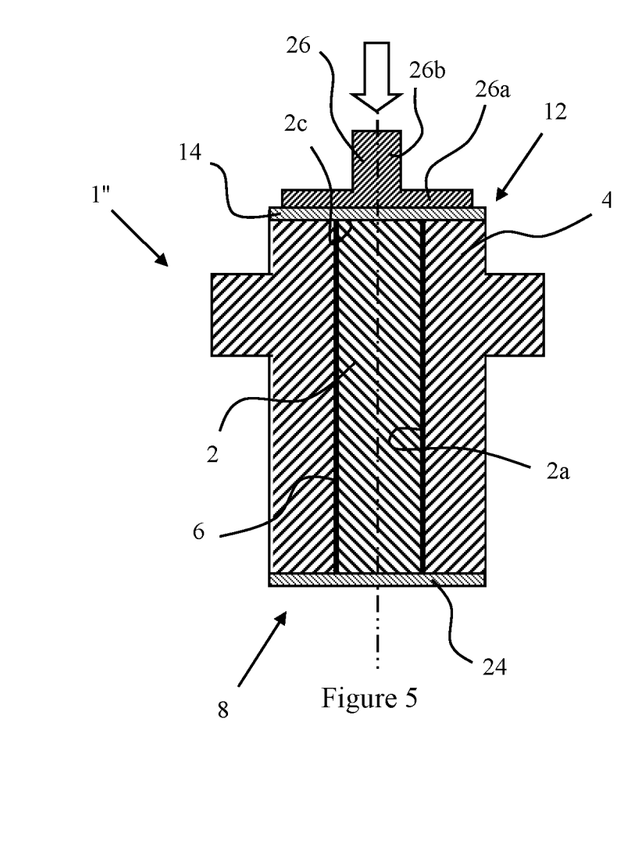
FIG. 5 is an axial cross section diagram showing a second coaxial sensor assembly according to the present invention.

FIG. 5 shows a second coaxial sensor assembly according to the present invention. The coaxial sensor body 1" is similar to the coaxial sensor body 1 shown in FIG. 1 and like parts have been given the same reference numerals. The sensor body 1" includes a front layer 24 instead of the window layer 10. The front layer 24 extends over substantially the whole of the front face of the sensor body and defines an electrode area. The electrode layer 6 is in electrical contact with the front layer 24. It can be seen that the core layer 2 of the coaxial sensor body 1" has a smaller diameter than the corresponding core layer of the coaxial sensor body 1 shown in FIG. 1. The diameter of the electrode layer 6 is also smaller. This can reduce sensor body capacitance and improve system sensitivity.

The pre-coated core body is inserted into an open bore in the pre-formed ceramic body that defines the outer insulating layer 4. The pre-coated core body and the outer insulating body are then bonded together using a suitable process such as sintering, diffusion bonding or brazing, for example. The bonding process produces an integral, multi-layer bulk ceramic component. The electrode layer can also be alternatively or additionally deposited as a coating on the cylindrical inner surface of the open bore in the pre-formed ceramic body that defines the outer insulating layer 4 before the ceramic body that defines the core layer is inserted into it.

The front layer 24 provides a hermetic seal at the front part 8 of the sensor body meaning that gas is excluded from all internal interfaces.

The front layer 24 is formed of several layers of a SiC-based coating (or a CrAlTiN- or MCrAlY-based coating) applied to the front surface of the bulk ceramic component using a CVD process.

Figure 6:
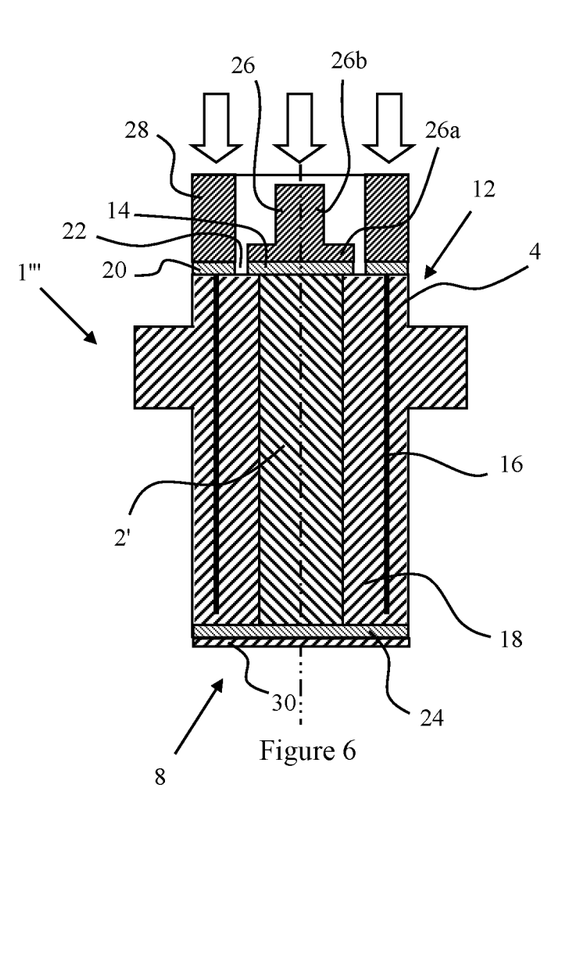
FIG. 6 is an axial cross section diagram showing a second triaxial sensor assembly according to the present invention.

FIG. 6 shows a second triaxial sensor assembly according to the present invention. The triaxial sensor body 1' is similar to the triaxial sensor body 1' shown in FIGS. 2 to 4 and the coaxial sensor body 1" shown in FIG. 3 and like parts have been given the same reference numerals.

The sensor body 1' does not include an electrode layer because the core layer 2' is made of an electrically conductive ceramic material (e.g., SiC) and defines a core electrode. In other arrangements, the core layer can be made of a metal or a ceramic/metal composite. The core layer 2' is in electrical contact with a front layer 24 that extends over substantially the whole of the front face of the sensor body 1' like the sensor body 1" shown in FIG. 5.

The core layer 2', the inner insulating layer 18 and the outer insulating layer 4 are pre-formed as separate ceramic components or bodies. The electrically conductive ceramic body that defines the core layer is inserted into an open bore in the pre-formed ceramic body that defines the inner insulating layer. The core body and the inner insulating body are then bonded together using a suitable process such as sintering, diffusion bonding or brazing, for example. The shield layer 16 is deposited as a coating on the cylindrical outer surface of the inner insulating body. The pre-coated inner insulating body and the bonded core body are inserted into an open bore in the pre-formed ceramic body that defines the outer insulating layer. The pre-coated inner insulating layer and the outer insulating body are then bonded together using a suitable process such as sintering, diffusion bonding or brazing, for example. The bonding process produces an integral, multi-layer bulk ceramic component. The shield layer can also be alternatively or additionally deposited as a coating on the cylindrical inner surface of the open bore in the pre-formed ceramic body that defines the outer insulating layer 4 before the ceramic body that defines the inner insulating layer is inserted into it. In an alternative process, the various ceramic bodies are coated with the shield layer and then bonded together in a single step using a suitable process such as sintering, diffusion bonding or brazing, for example.

The front layer 24 is formed of several layers of a SiC-based coating (or a CrAlTiN- or MCrAlY-based coating) applied to the front surface of the bulk ceramic component using a CVD process.

A thermal barrier coating 30 that includes a layer of yttria-stabilised zirconia (YSZ) is applied to the front layer 24 using any suitable process. Although the thermal barrier coating 30 is shown in FIG. 6 as extending only on the front face of the front layer 24, it can also extend along a part of the outer cylindrical surface of the front part 8 of the sensor body 1''' to provide additional protection to the sensor body from high operating temperatures. It will also be understood that a similar thermal barrier coating can be provided on the front part of the sensor body 1'' shown in FIG. 5 and even on the sensor bodies 1 and 1' shown in FIGS. 1 to 4 that include a window layer 10.

The invention claimed is:

1. A sensor assembly comprising:
an electrically conductive electrode bridge; and
a sensor body comprising:
a core layer;
an outer insulating layer that radially surrounds the core layer;
an electrically conductive electrode layer between the core layer and the outer insulating layer; and
an electrically conductive electrode interface layer at a rear part of the sensor body and in electrical contact with the electrode layer;
wherein the electrode bridge is in compression electrical contact with the electrode interface layer during use.

2. The sensor assembly according to claim 1, wherein the core layer and the outer insulating layer are pre-formed as separate components from the same electrically non-conducting ceramic material and bonded together to form an integral, multi-layer, ceramic body.

3. The sensor assembly according to claim 1, wherein the sensor body further comprises an electrically conductive shield layer positioned between the core layer and the outer insulating layer.

4. The sensor assembly according to claim 3, wherein the shield layer is spaced from the electrode layer by an inner insulating layer.

5. The sensor assembly according to claim 3, further comprising an electrically conductive shield bridge, wherein the sensor body further comprises an electrically conductive shield interface layer at a rear part of the sensor body and in electrical contact with the shield layer, wherein the shield bridge is in compression electrical contact with the shield interface layer.

6. The sensor assembly according to claim 1, wherein the outer insulating layer extends along a front part of the sensor body to define a window layer that provides a hermetic seal that excludes gas from any interface between the constituent layers of the sensor body.

7. The sensor assembly according to claim 6, wherein the electrode layer extends between the core layer and the window layer.

8. The sensor assembly according to claim 6, further comprising a thermal barrier coating formed on the window layer or the front layer.

9. The sensor assembly according to claim 1, wherein the sensor body further includes an electrically conductive front layer at a front part of the sensor body and in electrical contact with the electrode layer.

10. The sensor assembly according to claim 9, wherein the front layer provides a hermetic seal that excludes gas from any interface between the constituent layers of the sensor body.

11. The sensor assembly according to claim 1, wherein the electrode bridge is not bonded or otherwise physically secured to the electrode interface layer but is only in pressure contact with the electrode interface layer.

12. A sensor assembly comprising:
an electrically conductive electrode bridge; and
a sensor body comprising:
an electrically conductive core layer;
an outer insulating layer that radially surrounds the electrically conductive core layer; and
an electrically conductive electrode interface layer at a rear part of the sensor body and in electrical contact with the electrically conductive core layer;
wherein the electrode bridge is in compression electrical contact with the electrode interface layer during use.

13. The sensor assembly according to claim 12, wherein the core layer and the outer insulating layer are pre-formed as separate components from ceramic material and bonded together to form an integral, multi-layer, ceramic body.

14. The sensor assembly according to claim 12, wherein the sensor body further comprises an electrically conductive shield layer positioned between the core layer and the outer insulating layer.

15. The sensor assembly according to claim 14, wherein the shield layer is spaced from the core layer by an inner insulating layer.

16. The sensor assembly according to claim 14, further comprising an electrically conductive shield bridge, wherein the sensor body further comprises an electrically conductive shield interface layer at a rear part of the sensor body and in electrical contact with the shield layer, wherein the shield bridge is in compression electrical contact with the shield interface layer.

17. The sensor assembly according to claim 12, wherein the outer insulating layer extends along a front part of the sensor body to define a window layer that provides a hermetic seal that excludes gas from any interface between the constituent layers of the sensor body.

18. The sensor assembly according to claim 12, wherein the sensor body further includes an electrically conductive front layer at a front part of the sensor body and in electrical contact with the core layer.

19. The sensor assembly according to claim 18, wherein the front layer provides a hermetic seal that excludes gas from any interface between the constituent layers of the sensor body.

20. The sensor assembly according to claim 12, wherein the electrode bridge is not bonded or otherwise physically secured to the electrode interface layer but is only in pressure contact with the electrode interface layer.

\* \* \* \* \*

UNITED STATES PATENT AND TRADEMARK OFFICE
CERTIFICATE OF CORRECTION

| | |
|---|---|
| PATENT NO. | : 10,352,738 B2 |
| APPLICATION NO. | : 15/771220 |
| DATED | : July 16, 2019 |
| INVENTOR(S) | : Howard Elliott |

It is certified that error appears in the above-identified patent and that said Letters Patent is hereby corrected as shown below:

On the Title Page

At item (12), change "Elliot" to -- Elliott --.

At item (72), Inventor:, change "Howard Elliot" to -- Howard Elliott --.

Signed and Sealed this
Twenty-fifth Day of February, 2020

Andrei Iancu
*Director of the United States Patent and Trademark Office*